Aug. 22, 1950     F. R. KLEIMAN     2,520,039
TRAILER COUPLING
Filed April 28, 1947
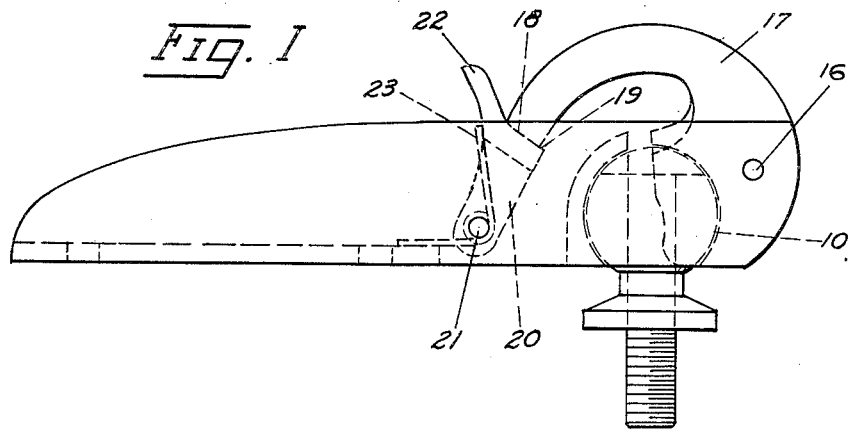
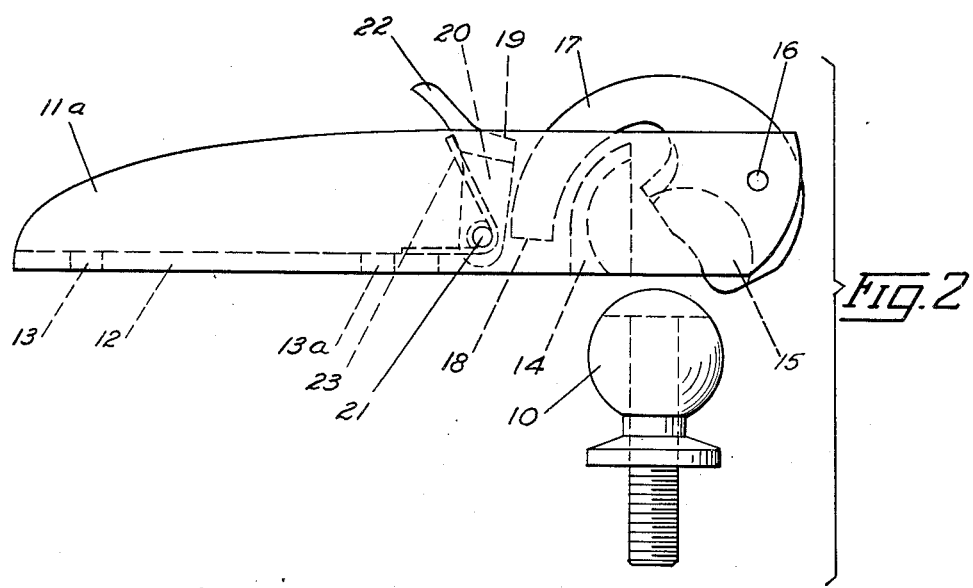
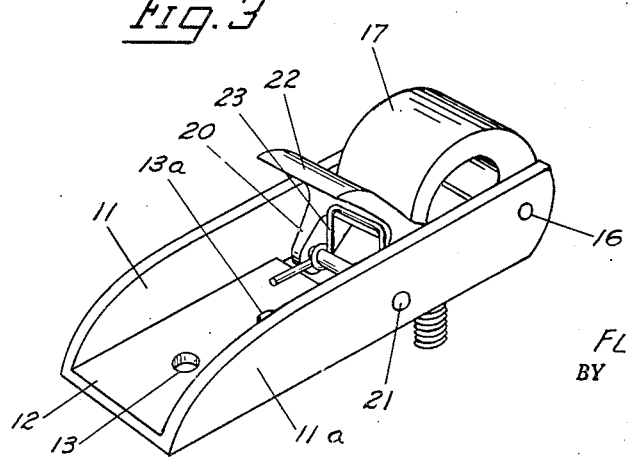
INVENTOR.
FLOYD R. KLEIMAN
BY
Flournoy Corey.
ATTORNEY.

Patented Aug. 22, 1950

2,520,039

UNITED STATES PATENT OFFICE 2,520,039

TRAILER COUPLING

Floyd R. Kleiman, Lincoln, Nebr.

Application April 28, 1947, Serial No. 744,311

3 Claims. (Cl. 280—33.17)

This invention relates to an improvement in trailer couplings of the ball and socket type, and particularly those in which the forces acting upon the coupling are utilized to hold the coupling in position.

The use of the ball and socket type coupling is common practice in the field of farm equipment where it is necessary to make frequent changes from one machine to another. In practice, however, the conventional hitch of this type requires the machine operator to dismount and frequently use special tools to disconnect the implement from the tractor.

It is a primary object of my invention to provide a trailer coupling which can easily and readily be connected or disconnected and yet one in which the operative parts may be formed of relatively strong and heavy materials.

Another primary object of my invention is to provide a tractor coupling in which the pulling force exerted against the coupling can be used to hold the coupler in a closed position.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is an elevation view of a coupling device, in the closed position, constructed in accordance with one embodiment of my invention.

Figure 2 is a view in elevation showing the device in Figure 1 in an open position.

Figure 3 is a view in perspective of the device shown in Figures 1 and 2.

Referring now to the drawings:

In a mechanism embodying my invention, the numeral 10 indicates a ball which is a standard hitching device used on most tractors and other pulling equipment. In the embodiment of my invention shown herein, I have provided a frame member U-shaped in cross section, composed of two parallel side members 11 and 11a connected by a base plate 12. The base plate has bolt holes 13 and 13a to permit the hitch to be attached to the farm implement which is to be towed. The base plate 12 extends for only a portion of the length of the side plates 11 and 11a.

Socket members 14 and 15 are mounted in the open end of the frame member between the sides 11 and 11a, said sides being extended to form ears.

Socket member 14 is rigidly attached to the side members while socket member 15 is pivotally mounted on pin 16 and has an arm 17 which extends in an arc around the ball 10 and the sockets 14 and 15. The arm 17 terminates in a right angle face 18 which, in the locked position, engages the corresponding face 19 of the locking mechanism 20 which, in turn, is pivotally mounted on pin 21 between side plates 11 and 11a. A tab 22 is provided as a part of the locking mechanism to permit its manual movement. To hold the locking mechanism in a closed position, a compression spring 23 is wrapped around the pin 21 with its outer ends resting against the base plate 12 and the tab 22.

It will be noted that the socket 15, arm 17 and the locking means 20 form a 180 degree arc around the ball 10 and that the faces 18 and 19 are well past the center of the arc thus formed.

In operation, the embodiment of my invention shown herein functions as follows. When the open coupling, shown in Figure 2, is let down on the ball 10, the socket member 15 is pushed upwardly which in turn moves the arm 17 in the same direction. When the face 18 of arm 17 moves past the face 19 of the locking means 20, the spring 23 biases the locking means inwardly, allowing the faces 18 and 19 to engage one another. In practice, the thrust forces encountered in towing are exerted against the socket member 15, thence through the arm 17 in an arc around the ball 10 to the lock 20. The faces 18 and 19, which are at right angles to the direction of force, tend to hold themselves in position by compression.

The hitch may be released easily by easing the thrusting force and manually swinging the locking mechanism 20 out of engagement with the arm 17.

Thus it will be seen that I have provided a coupling means which is easy to operate and one in which the pulling force serves to hold the coupling in a closed position and, further, that I have provided a mechanism in which the relative size of the locking means is not governed to any great degree by the size of the ball and socket.

Although I have shown one form of my invention, it will be apparent that other modifications may be made without departing from the spirit and scope of my invention as set forth in the appended claims.

I claim as my invention:

1. In a trailer coupling of the ball and socket type, a ball, a frame member, a pair of arms pivotally mounted in said frame member and adapted to engage each other at right angles to their line of force, one of said arms having a socket member as a portion thereof, and a second socket member fixedly mounted in said frame inwardly of the first socket member, said arms forming an arc around the ball.

2. In a trailer coupling of the ball and socket type, a ball, a U-shaped frame member having ears extending beyond one end thereof, a socket comprising a fixed inner portion mounted between the ears of said frame member and an outer portion pivotally mounted between the ears for movement relative to the fixed portion, the said outer portion having an integral locking arm extending inwardly of said frame and terminating in a right angle face, and a locking means pivotally mounted in said frame and adapted to engage the right angle face of the said locking arm.

3. In a trailer coupling of the ball and socket type, a frame having ears, extending from one end thereof, a ball, a socket member consisting of two opposed concave portions, one of said portions being fixedly mounted between said ears, the other of said portions being pivotally mounted between the said ears for movement selectively toward or away from the fixed socket portion, said pivotally mounted portion being positioned to receive the thrust force of said ball and having a locking arm integral therewith, and a locking member adapted to engage said locking arm, the said locking member and locking arm being so disposed as to form an arc around the ball.

FLOYD R. KLEIMAN.

REFERENCES CITED

The following references are of record in the file of this patent:

UNITED STATES PATENTS

| Number | Name | Date |
| --- | --- | --- |
| 1,483,613 | Payne | Feb. 12, 1924 |
| 1,757,009 | Dumond | May 6, 1930 |
| 2,130,705 | Radeleff | Sept. 20, 1938 |
| 2,265,850 | Martin | Dec. 9, 1941 |